United States Patent
Wong et al.

(10) Patent No.: US 10,754,975 B2
(45) Date of Patent: Aug. 25, 2020

(54) COMPUTING SYSTEM WITH EVENT GUIDANCE MECHANISM AND METHOD OF OPERATION THEREOF

(71) Applicant: LifeSite, Inc., Mountain View, CA (US)

(72) Inventors: Christopher Lloyd Wong, San Jose, CA (US); Yoon-Jin Chang, San Francisco, CA (US); Crystal Augustine Lee, San Francisco, CA (US); Amy Elaine Wong, San Jose, CA (US); Barney G. Lee, Santa Clara, CA (US); Joseph Michael Kolba, Endicott, NY (US); Daniel Youberg, Binghamton, NY (US); Eric R. Kisner, Johnson City, NY (US)

(73) Assignee: LifeSite, Inc., Mountain View, CA (US)

( * ) Notice: Subject to any disclaimer, the term of this patent is extended or adjusted under 35 U.S.C. 154(b) by 254 days.

(21) Appl. No.: 15/289,766

(22) Filed: Oct. 10, 2016

(65) Prior Publication Data

US 2018/0101696 A1 Apr. 12, 2018

(51) Int. Cl.
| | |
|---|---|
| *G06F 21/62* | (2013.01) |
| *H04L 29/08* | (2006.01) |
| *H04L 29/06* | (2006.01) |
| *G06Q 10/06* | (2012.01) |

(52) U.S. Cl.
CPC ..... *G06F 21/6245* (2013.01); *G06Q 10/0631* (2013.01); *H04L 63/0428* (2013.01); *H04L 63/105* (2013.01); *H04L 63/1416* (2013.01); *H04L 67/306* (2013.01)

(58) Field of Classification Search
CPC ........ G06Q 10/00; G06Q 40/06; G06Q 40/00; G06F 17/60
USPC ........................................................ 705/7.12
See application file for complete search history.

(56) References Cited

U.S. PATENT DOCUMENTS

| | | | |
|---|---|---|---|
| 7,124,435 B1 * | 10/2006 | Richard | H04L 63/101 726/6 |
| 7,930,560 B2 * | 4/2011 | Saito | G06F 17/30595 713/189 |
| 8,484,109 B1 * | 7/2013 | Nelson Deurmier | G06Q 40/02 705/35 |
| 9,191,720 B2 * | 11/2015 | Wong | H04N 21/482 |
| 9,268,933 B2 * | 2/2016 | Stecher | G06F 21/45 |
| 9,280,670 B2 | 3/2016 | Conte | |

(Continued)

OTHER PUBLICATIONS

G.B. Jones Towards Strategic Approach to Special Events Management in the Post-911 World: Naval Postgraduate School; pp. 1-115 (Year: 2005).*

*Primary Examiner* — Romain Jeanty
(74) *Attorney, Agent, or Firm* — Perspectives Law Group, Corp.

(57) ABSTRACT

A computing system includes: a storage unit configured to store protected personal information of a life profile; and a control unit, coupled to the storage unit, configured to: determine an event indicator for the protected personal information; monitor an event source associated with the protected personal information for the event indicator; determine the occurrence of a life event based on detecting the event indicator from the event source; and generate a life guidance to address the life event for displaying on a device.

20 Claims, 5 Drawing Sheets

(56) References Cited

U.S. PATENT DOCUMENTS

| | | | |
|---|---|---|---|
| 9,294,816 B2* | 3/2016 | Wheatley | H04N 21/44222 |
| 9,369,445 B2 | 6/2016 | Mahajan et al. | |
| 2001/0037223 A1* | 11/2001 | Beery | G06F 17/30893 |
| | | | 705/4 |
| 2002/0116243 A1* | 8/2002 | Mancisidor | H04L 41/16 |
| | | | 706/60 |
| 2006/0286519 A1* | 12/2006 | Burnham | G09B 7/02 |
| | | | 434/236 |
| 2008/0189162 A1* | 8/2008 | Ganong | G06Q 10/06311 |
| | | | 705/7.13 |
| 2009/0198511 A1* | 8/2009 | Boehlke | G06Q 50/22 |
| | | | 705/2 |
| 2011/0225015 A1* | 9/2011 | Spivack | G06Q 10/06314 |
| | | | 705/7.24 |
| 2013/0198050 A1* | 8/2013 | Shroff | H04L 41/5009 |
| | | | 705/34 |
| 2017/0286425 A1* | 10/2017 | Peterson | H04L 67/306 |

* cited by examiner

COMPUTING SYSTEM WITH EVENT GUIDANCE MECHANISM AND METHOD OF OPERATION THEREOF

TECHNICAL FIELD

An embodiment of the present invention relates generally to a computing system, and more particularly to a system for event guidance.

BACKGROUND

Modern consumer and industrial electronics, especially devices such grid-computing resources, a virtualized computer resource, cloud computing resource, are providing increasing levels of functionality to support modern life including remote and delocalized information storage. Research and development in the existing technologies can take a myriad of different directions.

As users become more empowered with the growth of electronic and computing systems, new and old paradigms begin to take advantage of this new device space. One such advancement has been online storage solutions for personal information. However the ability to provide guidance for events associated with the information on the online storage has presented new challenges for the users.

Thus, a need still remains for a computing system with event guidance based on stored personal information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including: a storage unit configured to store protected personal information of a life profile; and a control unit, coupled to the storage unit, configured to: determine an event indicator for the protected personal information; monitor an event source associated with the protected personal information for the event indicator; determine the occurrence of a life event based on detecting the event indicator from the event source; and generate a life guidance to address the life event for displaying on a device.

An embodiment of the present invention provides a method including: determining an event indicator for protected personal information; monitoring an event source associated with the protected personal information for the event indicator; determining the occurrence of a life event based on detecting the event indicator from the event source; and generating a life guidance to address the life event for displaying on a device.

An embodiment of the present invention provides a non-transitory computer readable medium including stored thereon instructions to be executed by a control unit comprising: determining an event indicator for protected personal information; monitoring an event source associated with the protected personal information for the event indicator; determining the occurrence of a life event based on detecting the event indicator from the event source; and generating a life guidance to address the life event for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Figure 1:
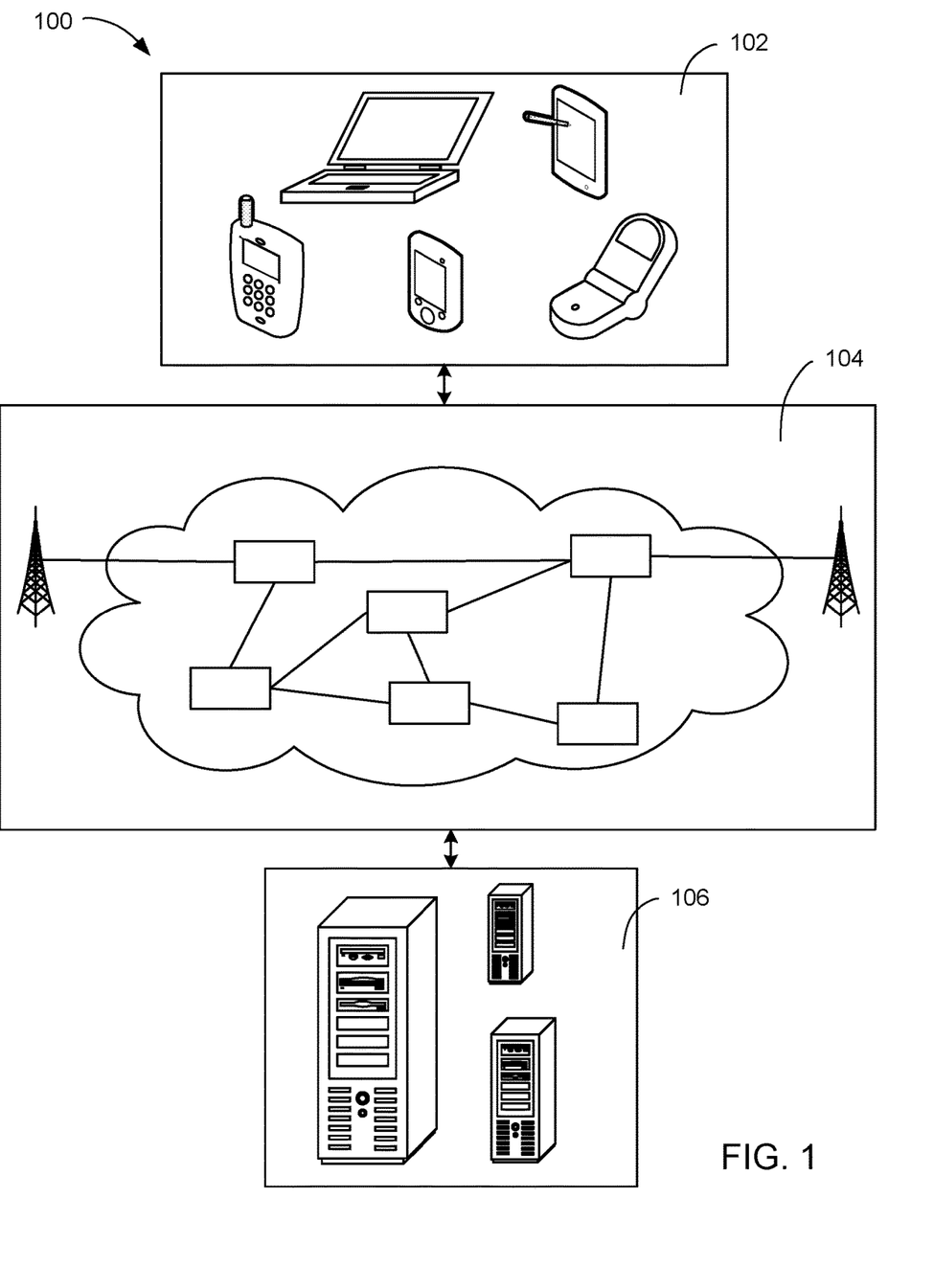
FIG. 1 is a computing system with event guidance mechanism in an embodiment of the present invention.

Referring now to FIG. 1, therein is shown a computing system 100 with event guidance mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a cellular phone, personal digital assistant, a tablet computer, a notebook computer, a web-enabled television set, a smart television, or a desktop computer. The first device 102 can couple, either directly or indirectly, to the communication path 104 to communicate with the second device 106 or can be a stand-alone device.

For illustrative purposes, the computing system 100 is described with the first device 102 as a mobile device, although it is understood that the first device 102 can be different types of devices. For example, the first device 102 can also be stationary computing device, such as a desktop computer.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
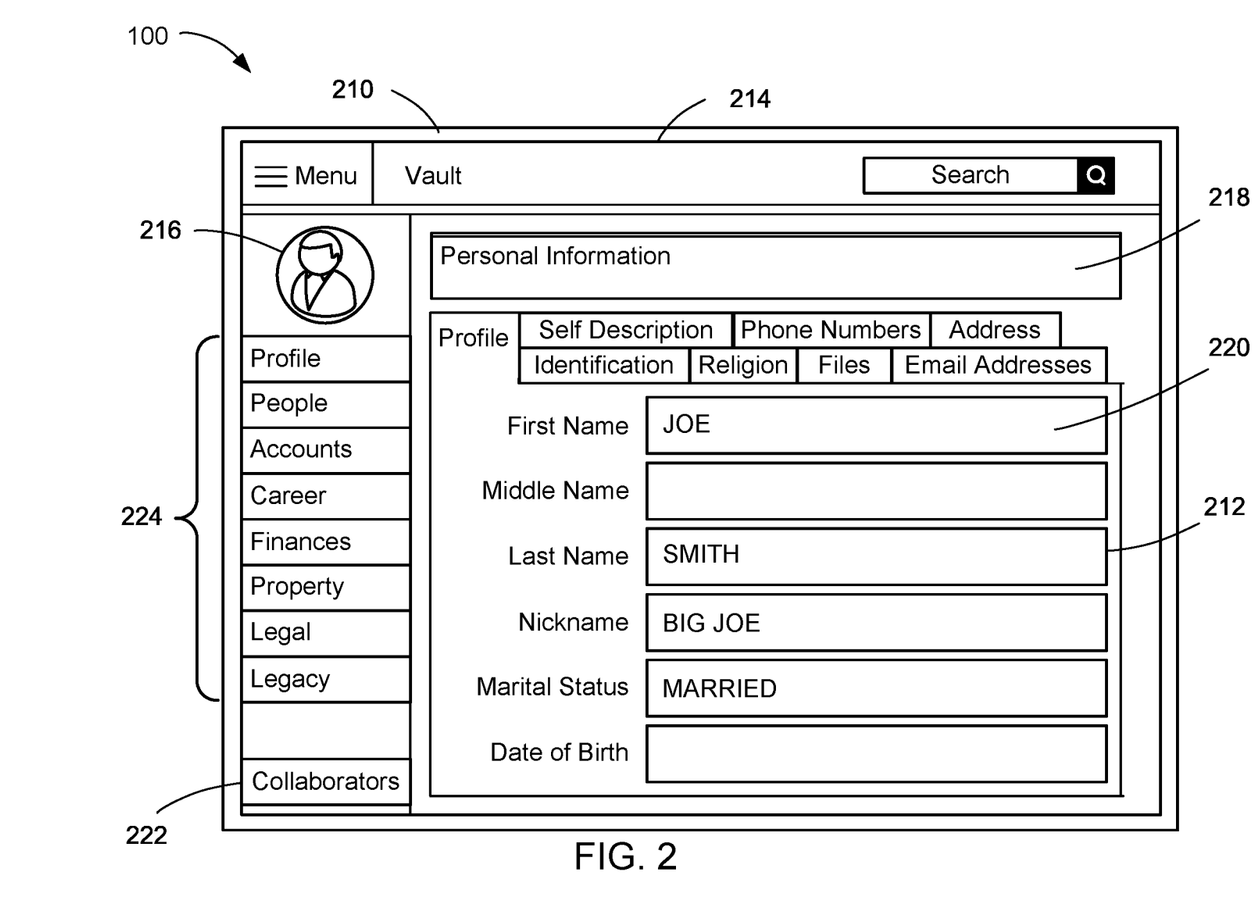
FIG. 2 is an example of an information interface of a life profile.

Referring now to FIG. 2, therein is shown an example of an information interface 210 of a life profile 214. The life profile 214 is a storage for personal information about a user of the system 100. For example, the life profile 214 can be a cloud based storage database for secure storage of personal user information 218 that has been encrypted. The personal user information 218 is information about a profile owner 216 of the life profile 214 that the profile owner 216 desires to protect from unauthorized access.

The personal user information 218 can include a wide variety of information categories 224 about the profile owner 216. For example, the personal user information 218 can include information categories 224 of, but not limited to: identity information; medical information; relationship and familial information; career and education information; financial investment information; account and membership information; or any combination thereof.

The computing system 100 can receive the personal user information 218 through information fields 212 in the information interface 210. The information fields 212 can be specific to an aspect of the personal user information 218 and can be organized into specific instances of the information categories 224. For example, the one of the information categories 224 for identity information can include, but is not limited to, the information fields 212 for: contact, residence, citizenship, and government issued identification information. In another example, one of the information categories 224 for medical information can include, but is not limited to, the information fields 212 for: existing medical conditions, medical history, medical insurance information, or physician contact information. In a further example, one of the information categories 224 for financial information can include, but is not limited to, the information fields 212 for: tax, retirement, and investment information, which can include the contact information for related advisors. The life profile 214 can also include information about online accounts associated with each of the information categories 224, such as bank, residential utilities, and shopping accounts, and can include login credentials and passwords for each of the online accounts.

The computing system 100 can securely store and protect the personal user information 218 as protected personal information 220. The protected personal information 220 is the personal user information 218 received by and stored on the computing system 100 that has been protected through an encryption mechanisms. More specifically, the protected personal information 220 can be the personal user information 218 stored in the life profile 214 of the profile owner 216. The encryption mechanism for generating the protected personal information 220 will be discussed in detail below.

The computing system 100 can enable the profile owner 216 to share the protected personal information 220; provide access to the protected personal information 220; change or modify the protected personal information 220; or a combination thereof. The life collaborators 222 are individuals or entities that are authorized to access the life profile 214 of the profile owner 216. For example, the life collaborators 222 can be a care giver, spouse, dependent, an advisor, or a combination thereof. The life collaborators 222 can be granted varying degrees of access to and control over the protected personal information 220 by the profile owner 216, which will be discussed in detail below.

Figure 3:
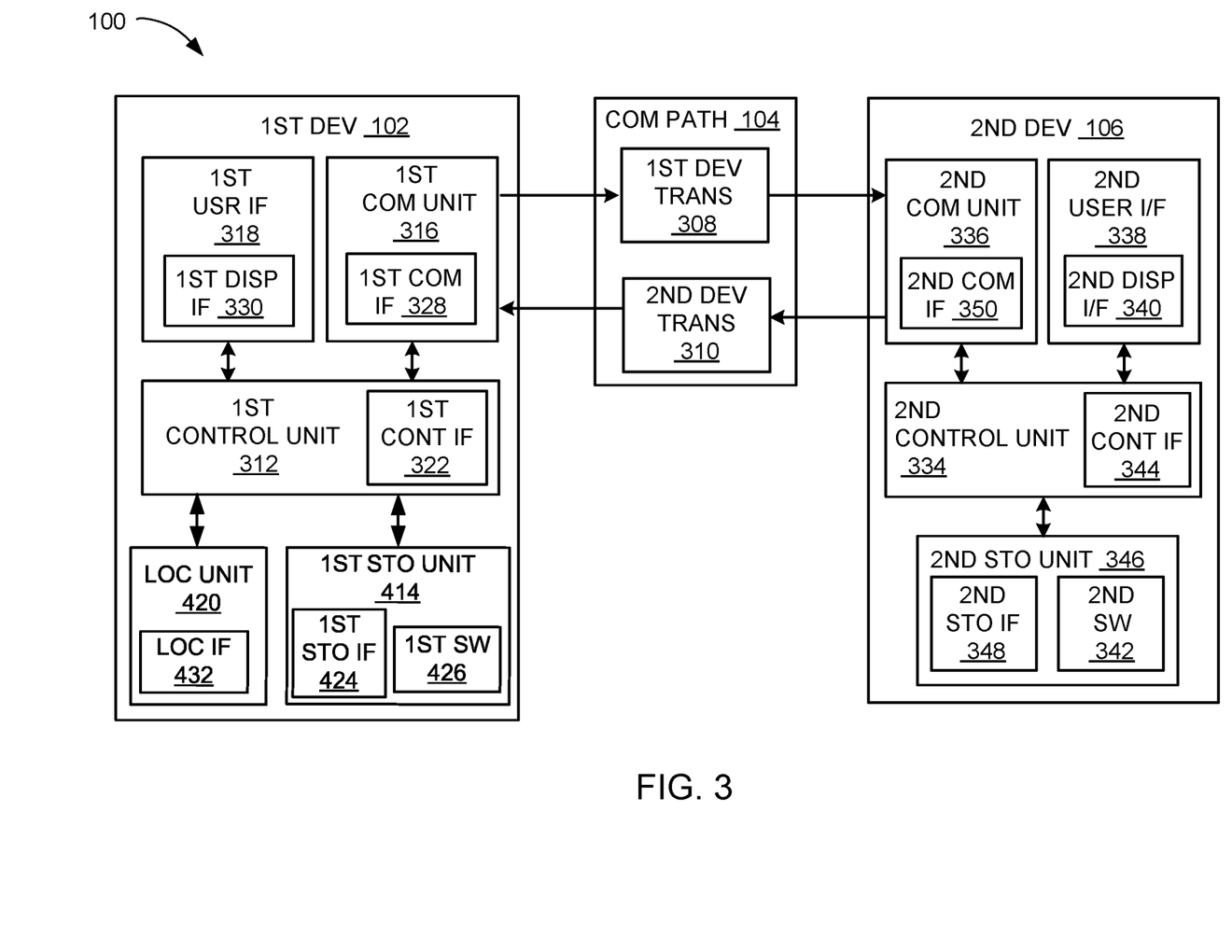
FIG. 3 is an exemplary block diagram of the computing system.

Referring now to FIG. 3, therein is shown an exemplary block diagram of the computing system 100. The computing system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as the protected personal information 220 of FIG. 2.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the computing system 100. The first control unit 312 can also execute the first software 326 for the other functions of the computing system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as the protected personal information 220. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The computing system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 4:
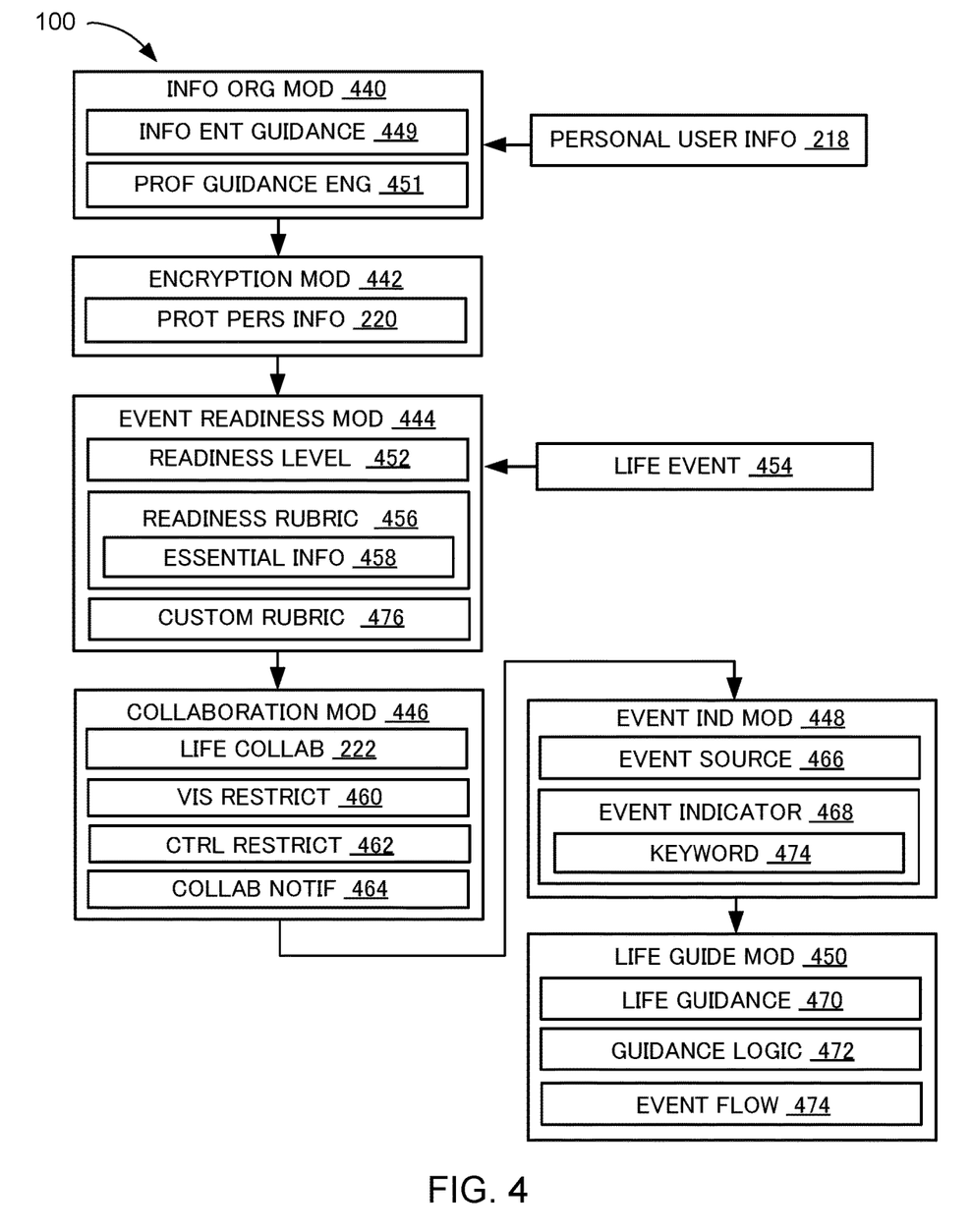
FIG. 4 is a control flow of the computing system.

Referring now to FIG. 4, therein is shown a control flow of the computing system 100. The computing system 100 can include an information organization module 440, an encryption module 442, an event readiness module 444, a collaboration module 446, an event indicator module 448, and a guidance module 450. Each of the modules can be coupled to one another. For example, the encryption module 442 can be coupled to the information organization module 440. In another example, the event readiness module 444 can be coupled to the encryption module 442. In a further example, the collaboration module 446 can be coupled to the event readiness module 444. In yet a further example, the event indicator module 448 can be coupled to the collaboration module 446. In yet a further example, the guidance module 450 can be coupled to the event indicator module 448.

The information organization module 440 is for receiving and storing the personal user information 218 of FIG. 2. The information organization module 440 can receive the personal user information 218 of the profile owner 216, both of FIG. 2, through the information fields 212 of the information interface 210, both of FIG. 2.

The information organization module 440 can provide information entry guidance 449 for entry of the personal user information 218. For example, the information organization module 440 can provide information entry guidance 449 as explanations of the relevance or importance for the different instances of the information fields 212 for an information category. In another example, the information entry guidance 449 can pose questions or provide suggestions for entry of the personal user information 218. In a further example, the information entry guidance 449 can dynamically change the information fields 212, such as by adding or removing certain instances of the information fields 212, based on an instance or a combination of instances of the personal user information 218 that has been received by the information organization module 440. More specifically, the information entry guidance 449 can add or remove the information fields 212 that are related to or provide additional details for other instances of the information fields 212. For example, the information fields 212 for marital status can be related to other instances of the information fields 212 that provide additional details about the marital status, such as spouse name or marriage license. In one implementation, if the information organization module 440 has received the personal user information 218 that indicates the "marital status" of the profile owner 216 as "single" or "unmarried," the information entry guidance 449 can remove the instance of the information fields 212 that corresponds to "spouse information."

In another implementation, the information organization module 440 can provide the information entry guidance 449 by adding or removing the information fields 212 based on a combination of the personal user information 218. For example, if the information organization module 440 receives the personal user information 218 that indicates the "marital status" of the profile owner 216 as "single" or "unmarried" in addition to receiving the personal user information for "dependents" that correspond to the names of the parents of the profile owner 216, information entry guidance 449 can add the information fields 212 for or related to "adult dependent care".

In a further implementation, the information organization module 440 can the provide information entry guidance 449 for entry of the personal user information 218 based the use of an information entry template. The information entry template can be predetermined information types describing an aspect or category of the personal user information 218. The information organization module 440 can overlay the personal user information 218 entered into the information interface 210 to determine the progress of information entry. As a specific example, the information organization module 440 can track the progress of information entry for a specific aspect of the life profile 214 and dynamically add or remove steps in the information entry guidance 449, as described above. The protected personal information 220 can be generated from the personal user information 218 received based on the information entry guidance 449 as described below.

The information organization module 440 can implement a profile guidance engine 451 to providing the information entry guidance 449. For example, the profile guidance engine 451 can be a pattern recognition or machine learning algorithm that correlates the protected personal information 220 in one or more instances of the life profile 214 to generate the information entry guidance 449. In one implementation, the profile guidance engine 451 can identify patterns or correlations in the personal user information 218 between multiple instances of the life profile 214, such as location and demographic information. For example, if a number of individuals representing different instances of the life profile 214 are located near a military base and have a common set or pattern of the personal user information 218 entered into the corresponding instances of the life profile 214, the profile guidance engine 451 can generate the information entry guidance 449 to incorporate the common set or pattern of the personal user information 218.

The information organization module 440 can receive the personal user information 218 as documents. For example, the profile owner 216 can upload electronic copies of documents to the life profile 214, such as legal documents, medical records, financial statements, or insurance policies. The information organization module 440 can extract the personal user information 218 from the uploaded electronic documents to generate the protected personal information 220. For example, the information organization module 440 can implement a text recognition program, such as an optical character recognition program, to identify and extract the personal user information 218 that corresponds to the information fields 212.

The computing system 100 can generate the protected personal information 220 from the personal user information 218, received by the information organization module 440, with the encryption module 442. For example, the encryption module 442 can implement various encryption schemes to encrypt the personal user information 218 of the profile owner 216. As a specific example, the encryption module 442 can implement a rotating encryption key to generate the protected personal information 220, which can rotate the encryption key after specified period of time, such as a number of days. In another specific example, the encryption module 442 can implement a double encryption scheme to generate the protected personal information 220. In yet a further example, the encryption module 442 can implement a layered encryption architecture for the protected personal information 220, which prevents unauthorized access to the different layers of the protected personal information 220.

The event readiness module 444 is for determining an event readiness level 452 of the life profile 214. The event readiness level 452 is a rating or measure of the readiness of the profile owner 216, based on the protected personal information 220 in the life profile 214, to address the occurrence of a particular instance of a life event 454.

The life event 454 is an event or changes in circumstances in the life of the profile owner 216. For example, the life event 454 can include, but are not limited to, the death of profile owner 216 or partner of the profile owner 216 or changes in the status of the profile owner 216, such as: marital status, status of dependents, employment or education status, or financial status.

The event readiness module 444 can determine the event readiness level 452 of the profile owner 216 with a readiness rubric 456. The readiness rubric 456 is a list of the protected personal information 220 that can be used to addressing the life event 454.

The readiness rubric 456 can include a list of essential information 458 that should be included in the life profile 214. The essential information 458 is information that is important for addressing an instance of the life event 454. As an example, for the life event 454 of a medical emergency, the readiness rubric 456 can include the essential information 458 of health insurance information, medical history, or primary care physician contact information. The list of the essential information 458 in the readiness rubric 456 can be determined by, for example, a subject matter expert for the life event 454.

As an example, the event readiness module 444 can determine the event readiness level 452 based the amount of the essential information 458 that is included life profile 214 of the profile owner 216. More specifically, the event readiness module 444 can determine the event readiness level 452 as a percentage of the number of matches between the protected personal information 220 and essential information 458 to the total number of the essential information 458 in the readiness rubric 456; a higher percentage indicates a higher degree of the event readiness level 452 to address the life event 454 while a lower percentage indicates a lower degree of the event readiness level 452 to address the life event 454.

The readiness rubric 456 can be specific to the different types of the life event 454. For example, the readiness rubric 456 for the life event 454 of death in the family can include a list of the essential information 458 that is different from the list of the essential information 458 for the life event 454 of retirement.

The event readiness module 444 can generate the readiness rubric 456 based on a custom rubric 476 provided by the profile owner 216, the life collaborators 222, or a combination thereof. The custom rubric 476 is a checklists defined by the profile owner 216, the life collaborators 222, or a combination thereof. For example, the custom checklist can be for addressing an event that is specific to the circumstances of profile owner 216, the life collaborator 222, or a combination there of.

In one implementation, the custom rubric 476 can be a modified version of an existing instance of the readiness rubric 456. For example the custom rubric 476 can include additional instances of the protected personal information 218 or omit instances of the protected personal information 218 of the readiness rubric 456 associated with a particular instance of the life event 454.

In another implementation, the custom rubric 476 can be for addressing the life event 454 that does not include an associated instance of the readiness rubric 456. For example, in a situation where the computing system 100 does not include the readiness rubric 456 for addressing the life event of "new driver in the family," the event readiness module 444 can generate the custom rubric 476 based on one or more instances of the protected personal information 218 selected by the profile owner 214, such as the identity and age of the "new driver;" the relationship of the "new driver" to the profile owner 214; insurance information; drivers education or training schedule, vehicle information, or a combination thereof.

In a further implementation, the event readiness module 444 can generate the readiness rubric 456 as an aggregate of the multiple instances of the custom rubric 476. For example, the event readiness module 444 can generate a new instance of the readiness rubric 456 based on common instances of the protected user information 220 that are included in the custom rubric 476 across multiple instances of the life profile 214 to address the life event 454 that does not include an associated instance of the readiness rubric 456.

The computing system 100 can implement the collaboration module 446 to enable the profile owner 216 to designate the life collaborators 222 of FIG. 2. For example, the collaboration module 446 can enable, through the life profile 214, the profile owner 216 to invite another user of the system 100 to be one of the life collaborators 222.

The collaboration module 446 can enable the profile owner 216 to control access of the life collaborators 222 to the protected personal information 220. For instance, the profile owner 216 can set access and control levels for each of the life collaborators 222 through the collaboration module 446. Access for the life collaborators 222 can include visibility restrictions 460 of the protected personal information 220.

The visibility restrictions 460 of the protected personal information 220 is defined as the accessibility of the life collaborators 222 to view or be made aware of instances of the protected personal information 220. The collaboration module 446 can enable the profile owner 216 to set the visibility restrictions 460 for each individual instance of the protected personal information 220. As a specific example, the visibility restrictions 460 can enable the profile owner 216 to allow visibility of certain instances of the protected personal information 220, such as the medical insurance carrier, but not others, such as the medical history of the profile owner 216.

In another example, the profile owner 216 can set the visibility restrictions 460 according to the information categories 224. As a specific example, the profile owner 216 can allow one of the life collaborators 222 to view the medical information, but restricts viewing of financial information. In a further example, the visibility restrictions 460 can be set based on a combination of restrictions to the information categories 224 and individual instances of the protected personal information 220. The visibility restrictions 460 can also be set to hide specified instances of the protected personal information 220 such that the specified instances of the protected personal information 220, the information categories 224 of the protected personal information 220, or a combination thereof do not appear on the life profile 214 for specified ones of the life collaborators 222.

Similar to the visibility restrictions 460, the profile owner 216 can enable the life collaborators 222 to control the protected personal information 220 with control restrictions 462. The control restrictions 462 determine the degree to which the life collaborators 222 can add, change, or remove instances of the protected personal information 220. In general, the control restrictions 462 prevent the life collaborators 222 from changing the protected personal information 220 of the profile owner 216. However, the collaboration module 446 can enable the profile owner 216 set the control restrictions 462 to authorize one or more of the life collaborators 222 to control or change one or more instances of the protected personal information 220.

The visibility restrictions 460 and control restrictions 462 for each of the life collaborators 222 can be set differently. For example, one of the life collaborators 222, such as a spouse, can have the visibility restrictions 460 and control restrictions 462 that authorize full access to view and change all the protected personal information 220 in the life profile 214 of the profile owner 216. In another example, the life collaborators 222, such as a financial advisor, can have the control restrictions 462 that prevent any changes to the life profile 214 and the visibility restrictions 460 that limited visibility of the life profile 214 to only the information categories 224 of the financial information.

The collaboration module 446 can enable the profile owner 216 to set a collaboration notification 464 to be sent to the life collaborators 222. For example, the collaboration module 446 can generate the collaboration notification 464 as an unresponsive owner notification to a specified one of the life collaborators 222 when the profile owner 216 does not respond to inquiries from the computing system 100 after a period of time or after a number of the inquiries have been sent to the profile owner 216. In another example, the collaboration module 446 can generate the collaboration notification 464 to be sent in conjunction with a notification sent to the profile owner 216. As a specific example, the collaboration module 446 can send the collaboration notification 464 as a reminder associated with the life profile 214 in conjunction with a reminder notification sent to the profile owner 216.

The event indicator module 448 is for determining the occurrence of the life event 454. The event indicator module 448 can determine the occurrence of the life event 454 based on an event source 466, an event indicator 468, or a combination thereof.

The event source 466 is a source of information that can provide information regarding the occurrence of the life event 454. For example, the event source 466 can be specific to one of the information categories 224 of the protected personal information 220. For example, for the instance of the information categories 224 of retirement, the event source 466 can be news sites associated to the retirement account of the profile owner 216 that includes information about government policy changes and social security benefits. In a further example, for the instance of the information categories 224 related to death or end of life care, the event source 466 can include obituaries from news publications in an area near residence of the profile owner 216.

The event indicator 468 is a trigger or condition that, when detected, indicates the occurrence of the life event 454. In one example, the event indicator 468 can be based on keywords 474 associated with protected personal information 220. In another example, the event indicator 468 can be based on detection of changes to the protected personal information 220.

In one implementation, the event indicator module 448 can determine the occurrence of the life event 454 based on monitoring the event source 466 for the event indicator 468. For example, for the event indicator 468 based on the keywords 474, the event indicator module 448 can monitor the event source 466 for the keywords 474 that match those of the event indicator 468, which would indicate the occurrence of the life event 454. In this implementation, the event indicator module 448 can monitor the event source 466 for the event indicator 468 with web crawling program.

As a specific example, for the event indicator 468 that includes the keywords 474 of "security breach" or "account hack," the event indicator module 448 can monitor the event source 466 that are associated with the online accounts of the profile owner 216 included in the protected personal information 220. If the event indicator module 448 detects the event indicator 468 in the event source 466, the event indicator module 448 can determine that the life event 454 of an account security breach has occurred.

In another implementation, the event indicator module 448 can determine the occurrence of the life event 454 for the event indicator 468 as a change to the protected personal information 220 in the life profile 214. For example, the event indicator module 448 can detect the event indicator 468 based on input by the profile owner 216, the life collaborators 222, or a combination thereof. More specifically, the event indicator module 448 can determine the occurrence of the life event 454 from inferences based on changes to the protected personal information 220.

For example, the event indicator module 448 can infer that the life event 454 has occurred when the profile owner 216 or the life collaborators 222 makes changes to specific instances of the protected personal information 220, such as marriage status, job status, addition of dependents. As a specific example, if the profile owner 216 change marital status from single to married or married to single, the event indicator module 448 can infer that the profile owner 216 has gotten married or divorced, respectively. As another specific example, if the profile owner 216 adds a new dependent to the instance of the information categories 224 of family members, the event indicator module 448 can infer that the profile owner 216 has had a new child.

Upon determining the occurrence of the life event 454, the computing system 100 can implement the guidance module 450 for generating life guidance 470. The life guidance 470 is defined as actions taken by the computing system 100 to assist the profile owner 216, the life collaborators 222, or a combination thereof, to address the life event 454. As specific examples, the life guidance 470 can include guidance for the life event 454, such as "Just Got Married" for marital status changes, "New Baby" for the birth of a child, "Child turned 18" when a child is no long under dependent status, "Relative in Hospice Care" when a parent become a dependent to the profile owner 216, or "Coping with Death" when the profile owner 216, or family member of the profile owner 216 passes away.

In an exemplary implementation, the guidance module 450 can generate the life guidance 470 with a guidance logic 472. The guidance logic 472 is a scheme for addressing the life event 454. For example, the guidance logic 472 can be a scheme that provides a plan for addressing the life event 454, including explanations of information and documents needed from the protected personal information 220, additional documents or information that is needed that may not be included in the protected personal information 220, timelines and actions to be taken, individuals or organizations that need to be contacted, or a combination thereof to address the life event 454.

The guidance logic 472 can be a dynamic scheme specific to the profile owner 216 that is based on the protected personal information 220. For example, the guidance module 450 can aggregate and evaluate the relevant instances of the protected personal information 220 in the context of the life event 454. In one implementation, the guidance module 450 can compare the protected personal information 220 to an event flow 474 for a particular instance of the life event 454. As an example, the event flow 474 can be a baseline or basic flowchart or decision tree for addressing the life event 454.

Based on the comparison of the protected personal information 220 and the event flow 474, the guidance module 450 can dynamically generate the life guidance 470 according to the specific instances of the protected personal information 220 that is included or missing from the life profile 214. In an example for the life event 454 of handling a death in the family, the guidance module 450 can generate the life guidance 470 having a course of action and plans if the life profile 214 includes the protected personal information 220 of a will and a different course of action or plan if the life profile 214 does not include a will.

The guidance module 450 can dynamically change, revise, adjust, update, modify, or a combination thereof the life guidance 470 as additional instances of the protected personal information 220 is generated from personal user information 218. For example, generating additional instances of the protected personal information 220 in response to the life guidance 470 request for additional instances of the personal user information 218 can trigger the next step in a flow or a decision of the life guidance 470 for subsequent action to be taken by the profile owner 214 or life collaborators 222 to continue addressing of the life event 454.

It has been discovered that the computing system 100 provides enhanced storage of and guidance based on protected personal information 220. The computing system 100 can determine the occurrence of the life event 454 based on the protected personal information 220 and provide life guidance 470 to address the life event 454, which provides enhanced and improved storage of the protected personal information 220.

The computing system 100 has been described with module functions or order as an example. The computing system 100 can partition the modules differently or order the modules differently. For example, the encryption module 442 can be coupled to the collaboration module 446 to provide the protected personal information 220.

The modules of FIG. 4 can be integrated with the hardware units of FIG. 3, implemented by the hardware units of FIG. 3, or a combination thereof. For example, the first user interface 318 of FIG. 3 for the first device 102 of FIG. 1, can receive the personal user information 218. In one implementation, the first communication unit 316 of FIG. 3 for the first device 102 can transmit the personal user information 218 to the second device 106 of FIG. 1. In another implementation, the first control unit 312 can execute encryption module 220 stored on the first software 326 of the first storage unit 324, both of FIG. 3, to generate the protected personal information 220 on the first device 102, which can then be transmitted to the second device 106. The second control unit 334 of FIG. 3 for the second device 106 can implement the second software 348 of FIG. 3 to execute the information organization module 440, the encryption module 442, the event readiness module 444, the collaboration module 446, the event indicator module 448, the guidance module 450, or a combination thereof. The second storage unit 346 of FIG. 3 for the second device 106 can store the protected personal information 220. In general, the modules described in FIG. 4 can be stored in the first storage unit 314 of the first device 102, the second storage unit 334 of the second device 106, or a combination thereof. Further, the modules described in FIG. 4, individually or in combination, can or be implemented by the first control unit 312 of the first device 102, the second control unit 334 of the second device 106, or a combination thereof.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 5:
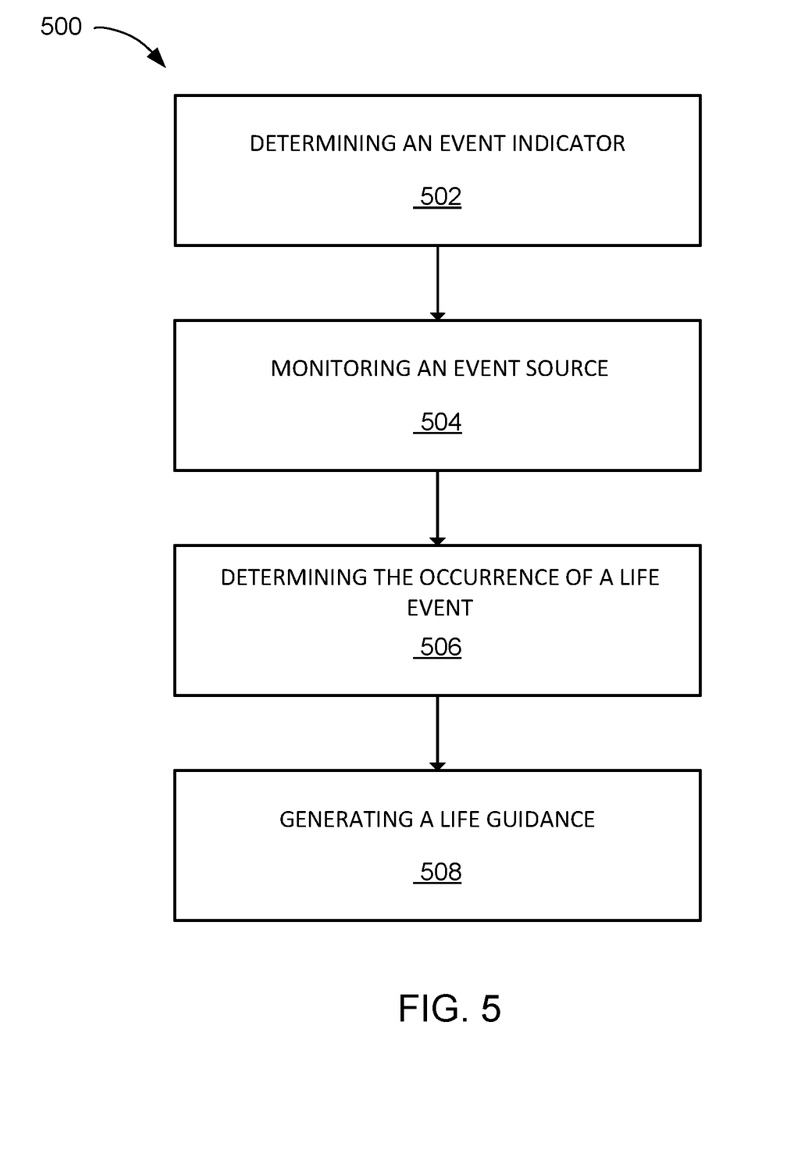
FIG. 5 is a flow chart of a method of operation of a computing system in an embodiment of the present invention.

Referring now to FIG. 5, therein is shown a flow chart of a method 500 of operation of a computing system 100 in an embodiment of the present invention. The method 500 includes: determining an event indicator for protected personal information in a block 502; monitoring an event source associated with the protected personal information for the event indicator in a block 504; determining the occurrence of a life event based on detecting the event indicator from the event source in a block 506; and generating a life guidance to address the life event for displaying on a device in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    a storage unit configured to store protected personal information of a life profile; and
    a control unit, coupled to the storage unit, configured to:
        provide information entry guidance for personal user information with a profile guidance engine for generation of the protected personal information for the life profile, wherein the profile guidance engine identifies patterns for correlation in the personal user information between multiple other instances of the life profile;
        determine an event indicator for the protected personal information;
        monitor an event source, including a website, associated with the protected personal information for the event indicator;
        determine the occurrence of a life event based on detecting the event indicator from the event source; and
        dynamically modify a life guidance to address the life event;
    a display interface, coupled to the control unit, configured to display the life guidance on a device.

2. The system as claimed in claim 1 wherein the control unit is configured to generate the life guidance based on a guidance logic specific to the life event.

3. The system as claimed in claim 1 wherein the control unit is configured to determine an event readiness level for addressing the life event based on a percentage of essential information included in the life profile.

4. The system as claimed in claim 1 the control unit is configured to provide the information entry guidance for generation of the protected personal information with the profile guidance engine, wherein the profile guidance engine is a pattern recognition algorithm.

5. The system as claimed in claim 1 wherein the control unit is configured to enable access to the protected personal information through the life profile of a life collaborator.

6. The system as claimed in claim 1 wherein the control unit is configured to determine the event indicator based on keywords associated with the life event.

7. The system as claimed in claim 1 the control unit is configured to encrypt the personal user information of a profile owner to generate the protected personal information.

8. The system as claimed in claim 1 wherein the control unit is configured to detect a security breach for personal accounts associated with the life profile.

9. The system as claimed in claim 1 the control unit is configured to generate a collaboration notification for a life collaborator associated with the protected personal information.

10. The system as claimed in claim 1 wherein the control unit is configured to determine the event indicator as changes to the protected personal information.

11. A method of operation of a computing system comprising:
    providing information entry guidance, with a control unit, for personal user information with a profile guidance engine for generation of protected personal information for a life profile, wherein the profile guidance engine identifies patterns for correlation in the personal user information between multiple other instances of the life profile;
    determining an event indicator for the protected personal information;
    monitoring an event source, including a website, associated with the protected personal information for the event indicator;
    determining the occurrence of a life event based on detecting the event indicator from the event source;
    dynamically modifying a life guidance to address the life event; and displaying the life guidance on a device.

12. The method as claimed in claim 11 wherein generating the life guidance includes generating the life guidance based on a guidance logic specific to the life event.

13. The method as claimed in claim 11 further comprising determining an event readiness level for addressing the life event based on a percentage of essential information included in the life profile.

14. The method as claimed in claim 11 wherein providing the information entry guidance for generation of the protected personal information with the profile guidance engine includes the profile guidance engine as a pattern recognition algorithm.

15. The method as claimed in claim 11 further comprising enabling access to the protected personal information through the life profile of a life collaborator.

16. A non-transitory computer readable medium including stored thereon instructions to be executed by a control unit comprising:
    providing information entry guidance for personal user information with a profile guidance engine for generation of protected personal information for a life profile, wherein the profile guidance engine identifies patterns for correlation in the personal user information between multiple other instances of the life profile;
    determining an event indicator for the protected personal information;
    monitoring an event source, including a website, associated with the protected personal information for the event indicator;
    determining the occurrence of a life event based on detecting the event indicator from the event source;
    dynamically modifying a life guidance to address the life event; and displaying the life guidance on a device.

17. The medium as claimed in claim 16 wherein generating the life guidance includes generating the life guidance based on a guidance logic specific to the life event.

18. The medium as claimed in claim 16 further comprising determining an event readiness level for addressing the life event based on a percentage of essential information included in the life profile.

19. The medium as claimed in claim 16 wherein providing the information entry guidance for generation of the protected personal information with the profile guidance engine includes the profile guidance engine as a pattern recognition algorithm.

20. The medium as claimed in claim 16 further comprising enabling access to the protected personal information through the life profile of a life collaborator.

\* \* \* \* \*